US012714100B2

(12) United States Patent
Bevinakatti et al.

(10) Patent No.: US 12,714,100 B2
(45) Date of Patent: Aug. 25, 2026

(54) ALKYL ETHERAMINE POLYGLYCEROL SURFACTANTS

(71) Applicant: NOURYON CHEMICALS INTERNATIONAL B.V., Amsterdam (NL)

(72) Inventors: Hanamanthsa Bevinakatti, Somerset, NJ (US); Shawn Zhu, Ringoes, NJ (US); Mojahedul Islam, Whitehouse Station, NJ (US)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 764 days.

(21) Appl. No.: 17/997,578

(22) PCT Filed: Apr. 28, 2021

(86) PCT No.: PCT/EP2021/061050

§ 371 (c)(1),
(2) Date: Oct. 31, 2022

(87) PCT Pub. No.: WO2021/219681

PCT Pub. Date: Nov. 4, 2021

(65) Prior Publication Data

US 2023/0165245 A1 Jun. 1, 2023

Related U.S. Application Data

(60) Provisional application No. 63/017,830, filed on Apr. 30, 2020, provisional application No. 63/017,835, filed on Apr. 30, 2020, provisional application No. 63/017,836, filed on Apr. 30, 2020.

(51) Int. Cl.
*A01N 25/30* (2006.01)
*A01N 57/20* (2006.01)
*A01P 17/00* (2006.01)

(52) U.S. Cl.
CPC ............ *A01N 25/30* (2013.01); *A01N 57/20* (2013.01); *A01P 17/00* (2021.08); *A01N 2300/00* (2013.01)

(58) Field of Classification Search
CPC .... A01N 25/30; A01N 57/20; A01N 2300/00; A01P 17/00; C11D 1/62; C11D 1/42
See application file for complete search history.

(56) References Cited

U.S. PATENT DOCUMENTS 3,074,815 A 1/1963 Lee et al.
4,528,023 A 7/1985 Ahle
5,118,444 A * 6/1992 Nguyen .............. C08G 65/321 424/757
5,226,943 A 7/1993 Hulshof
5,565,409 A 10/1996 Sato et al.
5,750,468 A 5/1998 Wright et al.
8,097,563 B2 1/2012 Yoshii et al.
8,828,911 B2 9/2014 Zhu
9,578,877 B2 2/2017 Parr et al.
2003/0096708 A1 5/2003 Agbaje et al.
2007/0122372 A1 5/2007 Danner
2010/0234228 A1* 9/2010 Lennon ................. A01N 61/00 504/206
2010/0279870 A1 11/2010 Stern et al.
2018/0289002 A1 10/2018 Stern et al.

FOREIGN PATENT DOCUMENTS

CN 1187105 A 7/1998
CN 1505479 A 6/2004
CN 102469778 A 5/2012
CN 104368271 A 2/2015
CN 110099944 A 8/2019
GB 1046896 A 10/1966
JP S60224602 A 11/1985
WO 9532942 A1 12/1995
WO 9632839 A2 10/1996
WO 9705779 A1 2/1997
WO 0108482 A1 2/2001
WO WO-0189302 A2 * 11/2001 ............ A01N 25/02
WO 02069718 A2 9/2002
WO 03068377 A1 8/2003
WO 2006091011 A1 8/2006
WO 2009082675 A1 7/2009
WO 2010020599 A2 2/2010
WO 2010068746 A2 6/2010
WO 2011026800 A2 3/2011
WO 2012080099 A1 6/2012

(Continued)

OTHER PUBLICATIONS

Raval "Copolymers and Block Copolymers in Drug Delivery and Therapy" Basic Fundamentals of Drug Delivery, 2019. (Year: 2019).*

Krough "Liquid chromatography-mass spectrometry method to determine alcohol ethoxylates and alkylamine ethoxylates in soil interstitial water, ground water and surface water samples" Journal of Chromatography A, 957 (2002) 45-57 (Year: 2002).*

Noiret "Polyglyceryl Amines as Surfactants I: Symmetrical Polyglyceryl Amines and Aqueous Solution Properties" Journal of Surfactants and Detergents, vol. 2, No. 3 (Jul. 1999) (Year: 1999).*

(Continued)

*Primary Examiner* — Sean M Basquill
*Assistant Examiner* — Rajan Pragani
(74) *Attorney, Agent, or Firm* — Ingrassia, Fisher & Lorenz LLP

(57) ABSTRACT

An agrochemical composition includes an agrochemical and a surfactant that has a structure (I)-(III). The surfactant may be further defined as an alkyl etheramine polyglycerol surfactant. In another embodiment, the surfactant may be further defined as an amine oxide, as also described above. In another embodiment, the surfactant may be further defined as a quat or quaternary ammonium compound.

16 Claims, No Drawings

(56) References Cited

FOREIGN PATENT DOCUMENTS

| | | | |
|---|---|---|---|
| WO | 2013098220 | A1 | 7/2013 |
| WO | 2013175498 | A2 | 11/2013 |

OTHER PUBLICATIONS

T. M. Muzyczko, S. Shore & J. A. Loboda, Journal of the American Oil Chemists' Society, vol. 45, pp. 720-725 (1968).

* cited by examiner

ALKYL ETHERAMINE POLYGLYCEROL SURFACTANTS

CROSS-REFERENCE TO RELATED APPLICATIONS

This application is a U.S. National-Stage entry under 35 U.S.C. § 371 based on International Application No. PCT/EP2021/061050, filed Apr. 28, 2021 which was published under PCT Article 21(2) and which claims the benefit of U.S. Provisional Application Nos. 63/017,830; 63/017,835; and 63/017,836, each of which was filed on Apr. 30, 2020, and each of which is expressly incorporated by reference herein in its entirety.

FIELD OF THE DISCLOSURE

The present disclosure generally relates to alkyl etheramine polyglycerol surfactants, their oxides, and quaternary ammonium compounds.

BACKGROUND OF THE DISCLOSURE

Many surfactants are used as adjuvants in pesticide compositions. Adjuvants can be used, for example, as a potentiator which is able to enhance the bioefficacy of the pesticides, a wetting agent, an emulsifier, a spreading agent, a deposition aid, a drift control agent, a water conditioner, a crystal inhibitor, a suspension aid, a thickener, or a dispersant. The bioefficacy of pesticides can be enhanced by the addition of appropriate surfactant adjuvants. For example, it is well known that the bioefficacy of herbicides, fungicides, and insecticides can be enhanced by nitrogen including surfactants such as alkyl amine alkoxylate surfactants. Examples of nitrogen including surfactants as potentiator adjuvants for herbicides can be found in U.S. Pat. Nos. 4,528,023 and 5,226,943. U.S. Pat. No. 5,226,943 also discloses that the activity of fungicide compositions can be improved by incorporating certain nitrogen including surfactants. Examples of nitrogen including surfactants as potentiator adjuvants for insecticides can be found in WO 201280099. Examples of nitrogen including surfactants as emulsifiers in pesticide emulsions can be found in U.S. Pat. Nos. 5,565,409 and 8,097,563. Examples of nitrogen including surfactants as thickeners in glyphosate compositions can be found in WO201020599. Examples of nitrogen including surfactants as drift control agents in pesticide emulsions can be found in WO2013098220.

Alkyl etheramine alkoxylates and their further derivatives are well-known surfactants useful in many industries such as agrochemicals, mining, cleaning, etc. In particular, ethoxylated alkyl etheramines have been used as adjuvants in pesticide formulations such as glyphosate herbicide formulations for many years (U.S. Pat. No. 5,750,468).

The production of alkyl (ether)amine ethoxylates requires a high degree of care and skill. Alkyl (ether)amine ethoxylates are made by reacting ethylene oxide and alkyl (ether) amines Ethylene oxide (EO) is a hazardous gaseous chemical (boiling point 10.7° C.). At room temperature, ethylene oxide is a flammable, irritating, and anesthetic gas. Because of its volatile nature, ethylene oxide is commonly handled and shipped as a refrigerated liquid to reduce the risk of fire or explosions. This increases transportation and storage costs. Because of the hazardous nature of ethylene oxide, the production of alkyl (ether)amine ethoxylates requires special design of the reactor requiring a pressured reactor with a gas feeding pipe.

Even though alkyl (ether)amine ethoxylates are difficult to manufacture, they are one of the most used adjuvants in pesticide compositions. An alkyl (ether)amine ethoxylate molecule contains a hydrophilic portion (a tertiary nitrogen with various ethylene oxide units) and a hydrophobic portion (hydrocarbon group) as shown for example in the following general formula:

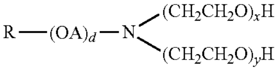

where R is a hydrocarbon group (i.e., the hydrophobic portion) of various chain lengths, A is a linear or branched $C_2$ to $C_4$ alkylene group, x and y can be various value, and b is 1 or greater than 1. It is this molecular structure that creates usefulness as adjuvants in agricultural applications.

To produce alkyl (ether)amine derivatives, hydrocarbons with various chain lengths are readily available, but hydrophilic groups have limited choices besides ethylene oxide. It is desirable to have alkyl (ether)amine derivatives that behave similarly to alkyl (ether)amine ethoxylates but that also: (1) are less hazardous while handling the components; (2) allow easier manufacturing conditions; and (3) possess better compatibility in high load pesticide compositions.

SUMMARY OF THE DISCLOSURE

This disclosure provides an agrochemical composition including an agrochemical and at least one surfactant having the structure:

(I)

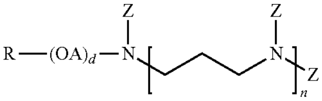

wherein each R is independently a $C_6$ to $C_{22}$ linear or branched, saturated or unsaturated hydrocarbon group;

wherein each Z is independently a glyceryl residue $(glyceryl)_a$ or H, so long as at least one Z is $(glyceryl)_a$ wherein a is of from about 1 to about 30;

wherein O is oxygen, A is independently a linear or branched $C_2$ to $C_4$ alkylene group, d is from about 1 to about 20; and wherein each n is independently of from about 0 to 5;

(II)

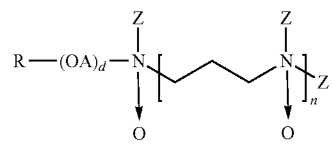

wherein each R is independently a $C_6$ to $C_{22}$ linear or branched, saturated or unsaturated hydrocarbon group;

wherein A is independently a linear or branched $C_2$ to $C_4$ alkylene group;

wherein d is from about 1 to about 20;

where each O is independently optionally present as long as at least one O is present;

wherein each Z is independently a glyceryl residue (glyceryl)$_a$ or H, as long as at least one Z is present wherein a is of from about 1 to about 30; and wherein each n is independently of from about 0 to 5; or (III)

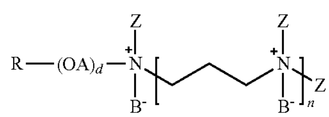

wherein each R is independently a $C_6$ to $C_{22}$ linear or branched, saturated or unsaturated hydrocarbon group;

wherein A is independently a linear or branched $C_2$ to $C_4$ alkylene group;

wherein d is from about 1 to about 20;

wherein each $B^-$ is independently optionally present and when present is $R^1X^-$, so long as at least one $B^-$ is present;

wherein each $R^1$ a methyl or ethyl group;

wherein each $X^-$ is independently $Cl^-$, $Br^-$, $CH_3OSO_3^-$, $CH_3CH_2OSO_3^-$;

wherein each Z is independently a glyceryl residue (glyceryl)$_a$ or H as long as at least one Z is present wherein a is of from about 1 to about 30; and wherein each n is independently of from about 0 to 5.

This disclosure also provides the at least one surfactant itself which may have structure (I)-(III) above except when it is structure (I), when A is a linear $C_3$ alkylene group and d is 1, n is from about 1 to about 5. In addition, other objects, desirable features and characteristics will become apparent from the summary and detailed description, and the appended claims, taken in conjunction with the accompanying drawings and the background.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description. It is to be appreciated that all numerical values as provided herein, save for the actual examples, are approximate values with endpoints or particular values intended to be read as "about" or "approximately" the value as recited.

This disclosure provides an agrochemical composition including an agrochemical and at least one surfactant having the structure:

(I)

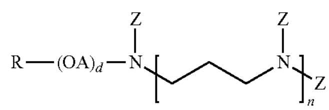

wherein each R is independently a $C_6$ to $C_{22}$ linear or branched, saturated or unsaturated hydrocarbon group;

wherein each Z is independently a glyceryl residue (glyceryl)$_a$ or H, so long as at least one Z is (glyceryl)$_a$ wherein a is of from about 1 to about 30;

wherein O is oxygen, A is independently a linear or branched $C_2$ to $C_4$ alkylene group, d is from about 1 to about 20; and wherein each n is independently of from about 0 to 5; or (II)

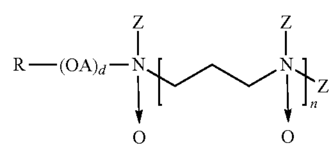

wherein each R is independently a $C_6$ to $C_{22}$ linear or branched, saturated or unsaturated hydrocarbon group;

wherein A is independently a linear or branched $C_2$ to $C_4$ alkylene group;

wherein d is from about 1 to about 20;

where each O is independently optionally present as long as at least one O is present;

wherein each Z is independently a glyceryl residue (glyceryl)$_a$ or H, as long as at least one Z is present wherein a is of from about 1 to about 30; and wherein each n is independently of from about 0 to 5; or (III)

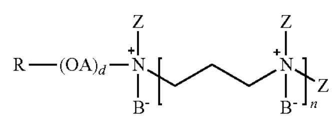

wherein each R is independently a $C_6$ to $C_{22}$ linear or branched, saturated or unsaturated hydrocarbon group;

wherein A is independently a linear or branched $C_2$ to $C_4$ alkylene group;

wherein d is from about 1 to about 20;

wherein each $B^-$ is independently optionally present and when present is $R^1X^-$, so long as at least one $B^-$ is present;

wherein each $R^1$ a methyl or ethyl group;

wherein each $X^-$ is independently $CH_3OSO_3^-$, or $CH_3CH_2OSO_3^-$;

wherein each Z is independently a glyceryl residue (glyceryl)$_a$ or H as long as at least one Z is present wherein a is of from about 1 to about 30; and wherein each n is independently of from about 0 to 5.

In one embodiment, the at least one surfactant in the agrochemical composition has the structure (I):

(I)

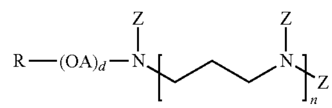

wherein each R is independently a $C_6$ to $C_{22}$ linear or branched, saturated or unsaturated hydrocarbon group;

wherein each Z is independently a glyceryl residue (glyceryl)$_a$ or H, so long as at least one Z is (glyceryl)$_a$ wherein a is of from about 1 to about 30;

wherein O is oxygen, A is independently a linear or branched $C_2$ to $C_4$ alkylene group, d is from about 1 to about 20; and wherein each n is independently of from about 0 to 5.

In another embodiment, the at least one surfactant in the agrochemical composition has the structure (I):

(I)

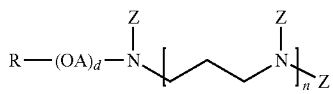

wherein each R is independently a $C_6$ to $C_{22}$ linear or branched, saturated or unsaturated hydrocarbon group;
wherein each Z is independently a glyceryl residue (glyceryl)$_a$ or H, so long as at least one Z is (glyceryl)$_a$ wherein a is of from about 1 to about 30;
wherein O is oxygen, A is independently a linear or branched $C_2$ to $C_4$ alkylene group, d is from about 1 to about 20; and
wherein each n is independently of from about 0 to 5, with the proviso that when A is a linear $C_3$ alkylene group and d is 1, n is from about 1 to about 5.

In another embodiment, the at least one surfactant in the agrochemical composition has the structure (II):

(II)

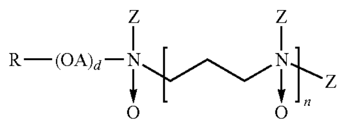

wherein each R is independently a $C_6$ to $C_{22}$ linear or branched, saturated or unsaturated hydrocarbon group;
wherein A is independently a linear or branched $C_2$ to $C_4$ alkylene group;
wherein d is from about 1 to about 20;
where each O is independently optionally present as long as at least one O is present;
wherein each Z is independently a glyceryl residue (glyceryl)$_a$ or H, as long as at least one Z is present wherein a is of from about 1 to about 30; and
wherein each n is independently of from about 0 to 5.

In this structure, and throughout this disclosure, the "arrow" present in the structure between N and O is as is understood by those in the chemical arts to represent electron donation to the O from the N, if/when the O is present.

In one embodiment, the at least one surfactant in the agrochemical composition has the structure (III):

(III)

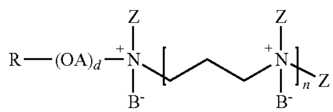

wherein each R is independently a $C_6$ to $C_{22}$ linear or branched, saturated or unsaturated hydrocarbon group;
wherein A is independently a linear or branched $C_2$ to $C_4$ alkylene group;
wherein d is from about 1 to about 20;
wherein each $B^-$ is independently optionally present and when present is $R^1X^-$, so long as at least one $B^-$ is present;
wherein each $R^1$ a methyl or ethyl group;
wherein each $X^-$ is independently $Br^-$, $CH_3OSO_3^-$, or $CH_3CH_2OSO_3^-$;
wherein each Z is independently a glyceryl residue (glyceryl)$_a$ or H as long as at least one Z is present wherein a is of from about 1 to about 30; and wherein each n is independently of from about 0 to 5.

As is appreciated by one of skill in the art, if $B^-$ is not present, then the nitrogen atom does not have a positive charge because the extra bond to $B^-$ would not then exist in such an embodiment.

This disclosure also provides the at least one surfactant itself which may have structure (I)-(III) above except when it is structure (I), when A is a linear $C_3$ alkylene group and d is 1, n is from about 1 to about 5.

It is contemplated that any one of the surfactants (I)-(III) above may be combined with any one or more surfactants (I)-(III) above. Therefore, combinations of two or three or more surfactants (I)-(III) above are hereby contemplated. Furthermore, each one of the surfactants (I)-(III) above may be utilized as a single surfactant or as a combination of two or more surfactants of each of the types (I)-(III) above. Moreover, so long as at least one of the surfactants (I)-(III) above is utilized, any compositions or formulations can be free of any of one or more of the other of the surfactants (I)-(III) above, or variants thereof, or can include one or more variants of one or more of the other of the surfactants (I)-(III) above.

It is contemplated that a surfactant component may be utilized herein, e.g. in a formulation or agrochemical composition, wherein the surfactant component includes one or more of the surfactants (I)-(III) above. For example, the surfactant component may include, be, consist essentially of, or consist of, one or more of the surfactants (I)-(III) above.

In the aforementioned embodiments, each R is independently a $C_6$ to $C_{22}$ linear or branched, saturated or unsaturated hydrocarbon group. For example, each R may have about 6 to about 22, about 7 to about 21, about 8 to about 20, about 9 to about 19, about 10 to about 18, about 11 to about 17, about 12 to about 16, about 13 to about 15, about 14 to about 15, or about 6, 7, 8, 9, 10, 11, 12, 13, 14, 15, 16, 17, 18, 19, 20, 21, or 22, carbon atoms. In various non-limiting embodiments, all values, both whole and fractional, and ranges of values, including and between those set forth above, are hereby expressly contemplated for use herein.

In one embodiment, one or more R groups is a linear hydrocarbon group

In one embodiment, one or more R groups is a branched hydrocarbon group

In one embodiment, one or more R groups is a saturated hydrocarbon group

In one embodiment, one or more R groups is an unsaturated hydrocarbon group.

In one embodiment, each R is independently a $C_8$-$C_{18}$ group. In another embodiment, each R is independently a $C_8$-$C_{16}$ group. In another embodiment, each R is independently a $C_8$-$C_{14}$ group. In another embodiment, each R is independently a $C_8$-$C_{12}$ group. In another embodiment, each R is independently a $C_8$-$C_{10}$ group. In another embodiment, each R is independently a $C_{10}$-$C_{18}$ group. In another embodiment, each R is independently a $C_{10}$-$C_{16}$ group. In another embodiment, each R is independently a $C_{10}$-$C_{14}$ group. In another embodiment, each R is independently a $C_{10}$-$C_{12}$ group. In another embodiment, each R is independently a $C_{12}$-$C_{18}$ group. In another embodiment, each R is independently a $C_{12}$-$C_{16}$ group. In another embodiment, each R is independently a $C_{12}$-$C_{14}$ group. In another embodiment, each R is independently a $C_{14}$-$C_{18}$ group. In another embodiment, each R is independently a $C_{14}$-$C_{16}$ group. In another embodiment, each R is independently a $C_{16}$-$C_{18}$ group.

In another embodiment, each R is independently a hydrocarbon group derived from an animal source, a vegetable source, a microbial/algae source, and combinations thereof.

In one embodiment, each R is independently a hydrocarbon group derived from a vegetable source. In one embodiment, each R is independently a hydrocarbon group derived from an animal source. In one embodiment, each R is independently a hydrocarbon group derived from a microbial/algae source.

Moreover, each $R^1$ is independently nothing, e.g. optionally present, or, if present, is a methyl or ethyl group. In one embodiment, one or more $R^1$ groups is a methyl group. In another embodiment, one or more $R^1$ groups is an ethyl group. In a further embodiment, one or more $R^1$ groups is a methyl group and one or more $R^1$ groups is an ethyl group.

In other embodiments, each n is independently of from about 0 to about 5, about 1 to about 4 or about 2 to about 3. Alternatively, each n is independently 0, 1, 2, 3, 4, or 5. In various embodiments, there is a proviso that when A is a linear $C_3$ alkylene group, then n is from about 1 to about 5. In various non-limiting embodiments, all values, both whole and fractional, and ranges of values, including and between those set forth above, are hereby expressly contemplated for use herein.

Furthermore, each A is a linear or branched $C_2$ to $C_4$ alkylene group. As such, each A is independently a $C_2$ to $C_4$ linear or branched alkylene group. In one embodiment, one or more OA groups is a $OCH_2CH_2$ group. In another embodiment, one or more OA groups is a $OCH_2CH_2CH_2$ group. In another embodiment, one or more OA groups is a $OCH_2CH_2CH_2CH_2$ or $OCH_2CH_2(CH_3)CH_2$ group. In further embodiments, combinations of groups are utilized, e.g. one or more $OCH_2CH_2$ and $OCH_2CH_2CH_2$ groups, one or more $OCH_2CH_2$ and $OCH_2CH_2CH_2CH_2$ (or $OCH_2CH_2(CH_3)CH_2$) groups, or one or more $OCH_2CH_2CH_2$ and $OCH_2CH_2CH_2CH_2$ (or $OCH_2CH_2(CH_3)CH_2$) groups. It is also contemplated that $OCH_2CH_2$ groups may be used to the exclusion of $OCH_2CH_2CH_2$ and/or $OCH_2CH_2CH_2CH_2$ (or $OCH_2CH_2(CH_3)CH_2$) groups, or $OCH_2CH_2CH_2$ groups may be used to the exclusion of or $OCH_2CH_2$ and/or $OCH_2CH_2CH_2CH_2$ (or $OCH_2CH_2(CH_3)CH_2$) groups, or that $OCH_2CH_2CH_2CH_2$ (or $OCH_2CH_2(CH_3)CH_2$) groups may be used to the exclusion of $OCH_2CH_2$ and/or $OCH_2CH_2CH_2$ groups. Moreover, these (OA) groups may be arranged in a block or random configuration.

In various embodiments, each Z is independently a glyceryl residue $(glyceryl)_a$ or H so long as at least one Z is $(glyceryl)_a$ or so as long as one Z is present. Typically, at least one (glyceryl) is present and, in many embodiments, more than one is present. In other words, in various embodiments, the (or each) surfactant must include at least one glyceryl residue. However, so long as the (or each) surfactant includes at least one glyceryl residue, any one or more of the remaining groups may be something other than glyceryl.

In various embodiments, a is of from about 1 to about 30. In other embodiments, each a is independently of from about 1 to about 30. For example, in various embodiments, each a is independently of from about 1 to about 30, 2 to about 29, about 3 to about 28, about 4 to about 27, about 5 to about 26, about 6 to about 27, about 7 to about 26, about 8 to about 25, about 9 to about 24, about 10 to about 23, about 11 to about 22, about 12 to about 21, about 13 to about 20, about 14 to about 19, about 15 to about 18, or about 16 to about 17. In other embodiments, each a is independently 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. In various non-limiting embodiments, all values, both whole and fractional, and ranges of values, including and between those set forth above, are hereby expressly contemplated for use herein.

In various embodiments, each d is independently of from about 1 to about 20. For example, in various embodiments, each b is independently of from about 1 to about 20, 2 to about 19, about 3 to about 18, about 4 to about 17, about 5 to about 16, about 6 to about 15, about 7 to about 14, about 8 to about 13, about 9 to about 12, or about 10 to about 11. In other embodiments, each b is independently 0, 1, 2, 3, 4, 5, 6, 7, 8, 9, 10, 11, 12, 13, 14, 15, 16, 17, 18, 19, or 20. In various non-limiting embodiments, all values, both whole and fractional, and ranges of values, including and between those set forth above, are hereby expressly contemplated for use herein.

In one embodiment, a polyglyceryl moiety can be linear or branched or cyclic. In another embodiment, a linear polyglyceryl moiety can have the following formula:

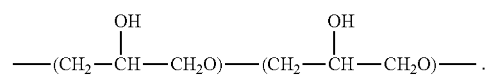

In still another embodiment, a branched polyglyceryl moiety can have the following formula:

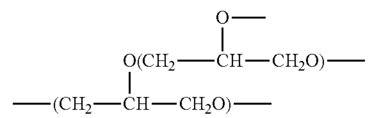

Propagation of the polyglyceryl moiety can be from the terminal primary hydroxyl of a glyceryl residue (resulting in a linear segment), or from the non-terminal secondary hydroxyl of the glyceryl residue (resulting in a branched segment).

Referring back, each $B^-$ is independently optionally present and when present is $R^1X^-$ so long as at least one $B^-$ is present. Moreover, each $R^1$ is a methyl or ethyl group. In one embodiment, one or more $R^1$ groups is a methyl group. In another embodiment, one or more $R^1$ groups is an ethyl group. In a further embodiment, one or more $R^1$ groups is a methyl group and one or more $R^1$ groups is an ethyl group.

Moreover, each $X^-$ is independently $Cl^-$, $Br^-$, $CH_3OSO_3^-$, or $CH_3CH_2OSO_3^-$, or is not present if $R^1$ is not present, so long as at least one $R^1X^-$ is present. In one embodiment, each $X^-$ is independently $Cl^-$, $Br^-$, $CH_3OSO_3^-$, $CH_3CH_2OSO_3^-$. In one embodiment, each $X^-$ is independently $Cl^-$. In another embodiment, each $X^-$ is independently $Br^-$. In another embodiment, each $X^-$ is independently $CH_3OSO_3^-$. In another embodiment, each $X^-$ is independently $CH_3CH_2OSO_3^-$. Alternatively, one or more $X^-$ can be nothing so long as at least one $R^1X^-$ is present.

Referring back, each O is oxygen. Moreover, each O is independently optionally present and when present is oxygen so long as at least one O is present.

In one embodiment, the surfactant may be further defined as alkyl etheramine polyglycerol or alkyletherpolyamine polyglycerol, or alkylether polyglycerylamines as described above. In another embodiment, the surfactant may be further defined as an amine oxide, as also described above. In another embodiment, the surfactant may be further defined as a quat or quaternary ammonium compound.

In one embodiment, the (or each) surfactant is the derivative of the reaction product or the reaction product of glycidol and at least one etheramine having the following structure:

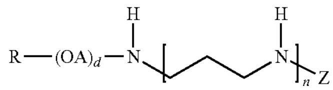

wherein R is a $C_6$ to $C_{22}$ linear or branched, saturated or unsaturated hydrocarbon group;

wherein O is an oxygen, A is $C_2$ to $C_4$ linear or branched alkylene group;

wherein d is a number from 1 to about 20; and wherein n is a number from about 0 to about 5.

As is known in the art, for polymers, subscripts are typically not whole numbers and may be fractional values, e.g. because they are average values. Accordingly, it is expressly contemplated that all subscripts values herein may be average values or may be fractional values including and between all values and ranges of values described herein, in various non-limiting embodiments. Alternatively one or more subscripts may be whole numerical values and may also still be average values.

In various embodiments, the condition for the reaction of alkyl etheramines with glycidol to obtain the surfactant is similar to the reaction condition of alkylamines with glycidol known in the art. Typically, the reaction proceeds at a temperature of from about 65° C. to about 165° C. with or without nitrogen atmosphere. Reaction can proceed without a catalyst or with a base catalyst such as for example, sodium hydroxide, potassium hydroxide, sodium carbonate, potassium carbonate, sodium methoxide, potassium methoxide etc.

In other embodiments, the reaction conditions for the oxide reaction of alkyl etheramines is similar to the well-known oxidation reaction conditions of alkyl amine alkoxylates. For example, the oxidation reaction with hydrogen peroxide can proceed at a temperature preferably below 70° C. A solvent such as water, a glycol or alcohol is typically used to reduce the viscosity of the product. The reaction can proceed without any catalysts.

In still other embodiments, the condition for the quaternization of alkyl etheramines is similar to the well-known quaternization condition of alkyl amine alkoxylates. For example, the quaternization with methyl chloride can proceed at a temperature below 110° C. in a sealed reactor. Reaction can proceed without a catalyst. A solvent such as water, a glycol or alcohol can be used to reduce the viscosity of the product.

It is contemplated that the surfactant of the instant present disclosure is not limited to any one particular method of forming and may involve any known suitable reactants and reaction conditions, as would be appreciated by one of skill in the art. In addition to the above reaction, other reactions to form oxides, and quaternary ammonium compounds may be utilized. For example, these reactions may proceed as described above or by any mechanism as would be appreciated by one of skill in the art.

In various embodiments, the surfactant is obtainable by reacting an alkyl etheramine with glycidol which is an improvement over alkyl etheramine ethoxylates. Glycidol is a liquid and is less hazardous than ethylene oxide based upon its classifications by various government bodies. Therefore, the handling of glycidol and the manufacturing of the surfactants of this disclosure are easier compared to the handling of ethylene oxide and the manufacture of alkyl etheramine ethoxylates. It is desirable to have alkyl etheramine derivatives that behave similarly to alkyl etheramine ethoxylates in various applications but that also: (1) are less hazardous while handling the components; and (2) allow easier manufacturing conditions.

Agrochemical Composition:

Referring back, the agrochemical composition includes one or more of the aforementioned surfactants and an agrochemical. In one embodiment, the agrochemical composition consists essentially of one or more of the aforementioned surfactants and the agrochemical. In such embodiments, the composition may be free of any surfactants that do not fall within the description of the surfactants herein.

As used herein, an agrochemical is a chemical used in agricultural compositions. Non-limiting examples of agrochemicals include fertilizers, micronutrients, activator adjuvants or potentiators, drift control agents, emulsifiers, deposition aids, water conditioners, wetting agents, dispersants, compatibility agents, suspension aids, pesticides such as herbicides, fungicides, and insecticides, and growth inhibitors.

In one embodiment, the agrochemical is chosen from herbicides, fungicides, insecticides and combinations thereof. In another embodiment, the herbicide is chosen from glyphosate, dicamba, glufosinate, 2,4-D, and combinations thereof.

In another embodiment, the agrochemical is glyphosate or glufosinate.

One embodiment of the present disclosure is an herbicide composition including one or more of the surfactants of the present disclosure. Suitable herbicides include, but are not limited to, acetochlor, acifluorfen, aclonifen, alachlor, ametryn, amidosulfuron, aminopyralid, amitrole, anilofos, asulam, atrazine, azafenidin, azimsulfuron, benazolin, benfluralin, bensulfuron-methyl, bentazone, bifenox, binalafos, bispyribac-sodium, bromacil, bromoxynil, butachlor, butroxidim, cafenstrole, carbetamide, carfentrazone-ethyl, chloridazon, chlorimuron-ethyl, chlorobromuron, chlorotoluron, chlorsulfuron, cinidon-ethyl, cinosulfuron, clethodim, clomazone, clopyralid, cloransulam-methyl, clorsulfuron, cyanazine, cycloate, cyclosulfamuron, cycloxydim, dalapon, desmedipham, dicamba, dichlobenil, dichlormid, diclosulam, diflufenican, dimefuron, dimepipeate, dimethachlor, dimethenamid, diquat, diuron, esprocarb, ethalfluralin, ethametsulfuron-methyl, ethofumesate, ethoxysulfuron, fentrazamide, flazasulfuron, florasulam, fluchloralin, flufenacet, flumetsulam, flumioxazin, fluometuron, flupyrsulfuron-methyl, flurochloridone, fluroxypyr, flurtamone, fomesafen, foramsulfuron, glufosinate, hexazinone, imazamethabenz-m, imazamox, mazapic, imazapyr, imazaquin, imazethapyr, imazosulfuron, iodosulfuron, ioxynil, isoproturon, isoxaben, isoxaflutole, Lactofen, lenacil, linuron, mefenacet, mesosulfuron-methyl, mesotrione, metamitron, metazachlor, methabenzthiazuron, metobromuron, metolachlor, metosulam, metoxuron, metribuzin, metsulfuron-methyl, molinate, MSMA, napropamide, nicosulfuron, norflurazon, oryzalin, oxadiargyl, oxadiazon, oxasulfuron, oxyfluorfen, paraquat, pendimethalin, phenmedipham, picloram, pretilachlor, profoxydim, prometryn, propanil, propisochlor, propoxycarbazone, propyzamide, prosulfocarb, prosulfuron, pyraflufen-ethyl, pyrazosulfuron, pyridate, pyrithiobac, quinclorac, quinmerac, rimsulfuron, sethoxydim, simazine, s-metolachlor, sulcotrione, sulfentrazone, sulfosulfuron, tebuthiuron, tepraloxydim, terbuthylazine, terbutryn, thifensulfuron-methyl, thiobencarb, tralkoxydim, tri-allate, triasulfuron, tribenuron-methyl, triclopyr, trifloxysulfuron, trifluralin, triflusulfuron-methyl, tritosulfuron, and combinations and combinations thereof. Typical herbicides are acetochlor, atrazine, dicamba, glufosinate, paraquat, glyphosate, 2,4-D and combinations and combinations thereof. More typical herbicides are 2,4-D, atrazine, dicamba, glyphosate, and glufosinate and combinations and combinations thereof. The most typical herbicides are glyphosate and glufosinate. When the herbicide is an acid, it can be used in the acid form though it is typical that the herbicide be in the salt form chosen from at least one of the groups of an amine, lithium, sodium, ammonium or potassium. It shall be pointed out that when a pesticide appears in the text as a general name without specifying the counterions, it means both its acid form and salt form throughout the specification.

Another embodiment of the present disclosure is a fungicide composition including one or more of the surfactants of the present disclosure. Examples of suitable fungicides include, but are not limited to, acibenzolar-S-methyl, aldimorph, amisulbrom, anilazine, azaconazole, azoxystrobin, benalaxyl, benodanil, benomyl, benthiavalicarb, binapacryl, biphenyl, bitertanol, blasticidin-S, boscalid, bromuconazole, bupirimate, captafol, captan, carbendazim, carboxin, carpropamid, chloroneb, chlorothalonil, chlozolinate, copper, cyazofamid, cyflufenamid, cymoxanil, cyproconazole, cyprodinil, dichlofluanid, diclocymet, diclomezine, dicloran, diethofencarb, difenoconazole, diflumetorim, dimethirimol, dimethomorph, dimoxystrobin, diniconazole, dinocap, dithianon, dodemorph, dodine, edifenphos, enestrobin, epoxiconazole, etaconazole, ethaboxam, ethirimol, etridiazole, famoxadone, fenamidone, fenarimol, fenbuconazole, fenfuram, fenhexamid, fenoxanil, fenpiclonil, fenpropidin, fenpropimorph, fentin acetate, fentin chloride, fentin hydroxide, ferbam, ferimzone, fluazinam, fludioxonil, flumorph, fluopicolide, fluoxastrobin, fluquinconazole, flusilazole, flusulfamide, flutolanil, flutriafol, folpet, fosetyl-Al, fthalide, fuberidazole, furalaxyl, furametpyr, guazatine, hexaconazole, hymexazole, imazalil, imibenconazole, iminoctadine, iodocarb, ipconazole, iprobenfos (IBP), iprodione, iprovalicarb, isoprothiolane, isotianil, kasugamycin, kresoxim-methyl, laminarin, mancozeb, mandipropamid, maneb, material of biological, mepanipyrim, mepronil, meptyldinocap, metalaxyl, metalaxyl-M, metconazole, methasulfocarb, metiram, metominostrobin, metrafenone, mineral oils, organic oils, myclobutanil, naftifine, nuarimol, octhilinone, ofurace, origin, orysastrobin, oxadixyl, oxolinic acid, oxpoconazole, oxycarboxin, oxytetracycline, pefurazoate, penconazole, pencycuron, penthiopyrad, phophorous acid and, picoxystrobin, piperalin, polyoxin, potassium bicarbonate, probenazole, prochloraz, procymidone, propamocarb, propiconazole, propineb, proquinazid, prothiocarb, prothioconazole, pyraclostrobin, pyrazophos, pyribencarb, pyributicarb, pyrifenox, pyrimethanil, pyroquilon, quinoxyfen, quintozene (PCNB), salts, silthiofam, simeconazole, spiroxamine, streptomycin, sulphur, tebuconazole, tecloftalam, tecnazene (TCNB), terbinafine, tetraconazole, thiabendazole, thifluzamide, thiophanate, thiophanate-methyl, thiram, tiadinil, tolclofosmethyl, tolylfluanid, triadimefon, triadimenol, triazoxide, tricyclazole, tridemorph, trifloxystrobin, triflumizole, triforine, triticonazole, validamycin, valiphenal, vinclozolin, zineb, ziram, and zoxamide, and combinations and combinations thereof.

Still another embodiment of the present disclosure is an insecticide composition including the alkyl etheramine polyglycerol surfactants of the present disclosure. Examples of suitable insecticides include, but are not limited to, kerosene or borax, botanicals or natural organic compounds (such as nicotine, pyrethrin, strychnine and rotenone), chlorinated hydrocarbon (such as DDT, lindane, chlordane), organophosphates (such as malathion and diazinon), carbamates (such as carbaryl and propoxur), fumigants (such as naphthalene) and benzene (such as mothballs), synthetic pyrethroids (such as bifenthrin and permethrin), neonicotinoids (such as imidacloprid, clothianidin, terpenoid (such as methoprene), and mixtures and combinations thereof.

One embodiment of the present disclosure is a surfactant composition comprising the surfactant and a diluent, wherein the concentration of the surfactant is from about 30 to about 90%, typically from about 40 to about 80%, or more typically from about 50 to about 75%. Typically, the diluent is chosen from water, glycols, liquid alcohol alkoxylate, and combinations thereof. In various non-limiting embodiments, all values, both whole and fractional, and ranges of values, including and between those set forth above, are hereby expressly contemplated for use herein.

Yet still another embodiment of the present disclosure is a combination including any herbicide, fungicide, and insecticide chosen from the above groups and further including one or more surfactants of the present disclosure.

The surfactants of the present disclosure can be used as a tank-mix additive or formulated in an in-can composition. They are suitable in solid pesticide compositions and, particularly, in liquid pesticide compositions.

Other additives that can be present in the compositions of the present disclosure are defoamers, diluents, compatibility agents, biocides, thickeners, drift control agents, dyes, fragrances, and chelating agents. The use of a compatibility agent may not be necessary due to the high compatibility of surfactants in high load pesticide compositions.

The use concentration of the surfactant of the present disclosure in an in-can pesticide composition may be from about 0.005% to about 30%, typically about 0.05% to about 20%, and more typically about 0.5% to about 15% in weight %. The pesticide concentration is from about 5% to about 90%, typically from about 10% to about 60%, and more typically from about 30% to about 55%, and still more typically from about 40% to about 55%, based on weight % agrochemical. In various non-limiting embodiments, all values, both whole and fractional, and ranges of values, including and between those set forth above, are hereby expressly contemplated for use herein.

The use concentration of the surfactant of the present disclosure in a tank mix pesticide spray solution may be from about 0.001% to about 5%, typically about 0.01% to about 2%, and more typically about 0.1% to about 1% (in weight % surfactant basis) in the total spray solution. In various non-limiting embodiments, all values, both whole and fractional, and ranges of values, including and between those set forth above, are hereby expressly contemplated for use herein.

Also disclosed is a method of treating plants or vegetation with the compositions of the disclosure. The method comprises applying an effective amount of the agricultural composition to plants (particularly crops) to kill or control pests. The agricultural composition listed above is contacted with the pest. The agricultural composition may be used in the above listed form or diluted with water or an appropriate diluent.

Typically, all units described herein are in weight percent (i.e., wt. %).

The surfactants of the disclosure may also be used with other surfactants such as alkylamine alkoxylates and their quaternaries, anionic surfactants such as alkyl or ether sulfate, alkyl or aryl sulfonate, phosphate ester and ethoxylated phosphate ester, nonionic surfactants such as alcohol alkoxylates, alkyl (C6-C18) polyglucoside, amphoteric surfactants, quaternary surfactants, and silicone surfactants.

The following non-limiting examples are presented to further illustrate and explain the present disclosure.

EXAMPLES

Example 1. Synthesis of Alkyl Etheramine Polyglycerol (AEP)

Raw-Materials Used

Glycidol (Sigma):

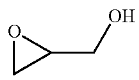

Armeen EA-13i Tridecyl etheramine (Nouryon):

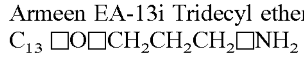

$C_{13}$ □O□$CH_2CH_2CH_2$□$NH_2$

Tomamine PA14 iso-C10 etheramine (Evonik):

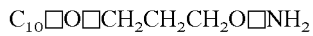

$C_{10}$□O□$CH_2CH_2CH_2O$□$NH_2$

Tomamine DA14 iso-C10 ether diamine (Evonik):

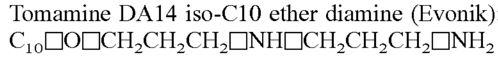

$C_{10}$□O□$CH_2CH_2CH_2$□NH□$CH_2CH_2CH_2$□$NH_2$

Jeffamine® XTJ 435; Huntsman

Poly[oxy(methyl-1,2-ethanediyl)], alpha-(2-aminopropyl)-omega-hydroxy-C12-16-alkyl ethers

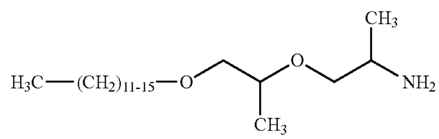

or

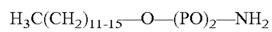

$H_3C(CH_2)_{11-15}$—O—$(PO)_2$—$NH_2$

Abbreviations Used

"xG" means the alkyl etheramine polyglycerol with x mole of glycerol in the molecule.

TABLE 1

Synthesis/Compound Examples

| Sample # | Description (etheramine + approx. theoretical average glycerol units) |
|---|---|
| 1 | Tomamine PA 14-2G |
| 2 | Tomamine PA 14-4G |
| 3 | Armeen EA 13i-2G |
| 4 | Armeen EA 13i-4G |
| 5 | Armeen EA 13i-10G |
| 6 | Armeen EA 13i-12G |
| 7 | Tomamine DA 14-3G |
| 8 | Tomamine DA 14-6G |
| 9 | Jeffamine ® XTJ 435-2G (without catalyst) |
| 10 | Jeffamine ® XTJ 435-3G (without catalyst) |
| 11 | Jeffamine ® XTJ 435-3G (with catalyst) |
| 12 | Jeffamine ®XTJ 435-4G (with catalyst) |
| 13 | Jeffamine ® XTJ 435-5G (with catalyst) |
| 14 | Armeen EA 13i-10G N-oxide |
| 15 | Armeen EA 13i-12G N-oxide |

TABLE 1-continued

Synthesis/Compound Examples

| Sample # | Description (etheramine + approx. theoretical average glycerol units) |
|---|---|
| 16 | Armeen EA 13i-2G methyl chloride quat |
| 17 | Armeen EA 13i-10G methyl chloride quat |
| 18 | Armeen EA 13i-12G methyl chloride quat |

Synthesis Procedure to Prepare Alkyl Ether Polyglycerols (Sample #1-8)

The following procedure was used to prepare Tomamine PA 14-2G (sample #1), and similar procedure was used to synthesize the additional samples, with the relevant fatty amine and glycidol molar ratios adjusted appropriately as described below.

Glycidol (37 g, 0.5 mol) was added dropwise over a period of 1.5 hrs. to Tomamine PA 14 (isodecyloxypropyl amine) (also called as iso-C10 etheramine) (53.75 g, 0.25 mol) stirred in a round bottom flask under nitrogen atmosphere keeping the temperature of the reaction mixture between 130° to 146° C. The reaction mixture was further stirred for about an hour at around 110°-120° C. until IR analysis showed no more epoxide peaks around 840 cm-1 due to glycidol. A clear pale brown viscous liquid product obtained was collected.

The products thus obtained can optionally be further diluted by adding necessary amount of water or other solvents/diluents.

The process was repeated using the indicated ether amine in the relevant molar ratio with glycidol as shown in Table 1 to prepare samples #2-8. For example, for sample #2, the process used for sample #1 was repeated using molar ratio of 1:4 for Tomamine PA 14 and glycidol, sample #3 used a molar ratio of 1:2 for Armeen EA 13i and glycidol, and so forth.

Synthesis Procedure to Prepare Jeffamine XTJ 435-2G (Sample #9) without Catalyst The following procedure was used to prepare Jeffamine® XTJ 435-2G (sample #9), and similar procedure was used to synthesize sample #10, with the relevant glycidol molar ratios adjusted appropriately as described below.

Glycidol (30.83 g, 0.4 mol after purity correction) was added dropwise at the rate of around 23 ml per hour to Jeffamine® XTJ 435 (65 g, 0.2 mol) stirred in a round bottom flask under nitrogen atmosphere keeping the temperature of the reaction mixture between 138° to 148° C. The reaction mixture was further stirred for about an hour at around 110°–120° C. after the addition was over until IR analysis showed no more epoxide peaks around 840 cm-1 due to glycidol. A clear yellow viscous liquid product obtained was collected.

The above process was repeated using 1:3 molar ratios of the etheramine to glycidol to prepare sample #10.

Synthesis Procedure to Prepare Jeffamine XTJ 435-3G (Sample #11) Using Catalyst

A mixture of Jeffamine® XTJ 435 (55.25 g, 0.17 mol) and crushed KOH (0.95 g, 0.017 mol) was stirred at around 130° C. in a round bottom flask with nitrogen sparging for about 30 minutes to remove the trace amount of water. To this stirred clear solution was added glycidol (39.31 g, 0.51 mol after purity correction) dropwise at the rate of around 19 ml per hour under nitrogen atmosphere by keeping the temperature of the reaction mixture between 130° to 149° C. The reaction mixture was further stirred for about an hour at around 110° 420° C. after the addition was over until IR analysis showed no more epoxide peaks around 840 cm-1 due to glycidol. The light brown product obtained was used without any further purification.

The process described above for sample #11 was repeated using relevant molar ratios of the etheramine to glycidol as shown in Table 1 to prepare sample #12 and 13.

The products thus obtained can optionally be further diluted by adding necessary amount of water or other solvents/diluents.

For glycidol addition, various addition temperature ranges can be used from about 60° C. to about 160° C., or from about 80° C. to about 135° C. Moreover, the rate of addition can be varied from about 5 ml per hour to about 3 to 4 days, depending on the scale of the reaction. It is to be expected that side products such as polyglycerol can be formed in the final product. The samples described herein and in the following examples were used without further purification.

Synthesis Procedure to Prepare Alkyl Ether Polyglycerylamine N-Oxides

The following procedure was used to prepare Armeen EA 13i-10G N-oxide (sample #14), and similar procedure was used to synthesize the additional sample #15, with the relevant alkyl ether polyglycerylamine and hydrogen peroxide molar ratios adjusted appropriately.

The round bottom flask containing 237.7 grams (0.24 moles) of Armeen EA13i-10G (Sample #5) and 1.2 grams of Dequest 2010 was warmed to 60° C. and 31.6 grams (0.325 moles) of hydrogen peroxide (35 wt. % in water) was slowly added to this stirred mixture from a metered dropping funnel. Once the addition was complete, the reaction was then heated to 70° C. for two hours, cooled and collected as a yellow, viscous product.

Synthesis Procedure to Prepare Alkyl Ether Polyglycerylamine Methyl Chloride Quats The following procedure was used to create Armeen EA13i-2G methyl chloride quat (sample #16), and similar procedure was used to synthesize the additional samples #17 and 18, with the relevant alkyl ether polyglycerylamine and methyl chloride molar ratios adjusted appropriately.

To a 2 L autoclave was charged Armeen EA13i-2G (sample #3) (306 g, 0.75 moles), sodium bicarbonate (9 g), and ethanol (312 g). The autoclave was sealed, leak checked, and pressurized/depressurized three times with 80 psig nitrogen. The reactor contents were heated to 105° C. and methyl chloride (85 g, 1.7 moles) was added. The reaction was monitored by measuring free amine Depending on the free amine analyses, additional amounts of methyl chloride were added, if necessary. Once the free amine was below 10%, the reaction was cooled to 50° C. and sparged with nitrogen at 200 cc/min. for 1 hour. The contents were then discharged, filtered, and stripped of ethanol using a rotary evaporator. The neat product was then diluted with water as required.

Samples #17 and 18 were made using the same procedure as described above by adjusting the molar ratios using isopropanol as a solvent instead of ethanol.

Example 2. Diluted Surfactant Compositions

Some surfactants (which may include by-products such as polyglycerols) have a very high viscosity and are difficult to handle. Moreover, these products can form hard gels when added to water (or an aqueous solution) and the gels can take a long time to dissolve. These high viscosity products may be converted into easy to handle products in practice. Water was found to be effective in reducing the viscosity of the products and minimizing the gel forming potential in some surfactant. The examples are shown in Table 2 below.

TABLE 2

Effect of diluent (water) on gel formation

| Sample # | Surfactant | wt. % Surfactant | wt. % Water | Comment 1 | Comment 2 |
|---|---|---|---|---|---|
| 2.1 | Armeen EA-13i-10G | 81.63 | 18.37 | Heated to ~80° C. to dissolve in water. Sample is flowable at room temp. | 81.63% Surfactant is easily dissolved in water at room temp. |
| 2.2 | Armeen EA-13i-12G | 80.6 | 19.4 | Heated to ~80° C. to dissolve in water. Sample is flowable at room temp. | 80.6% Surfactant is easily dissolved in water at room temp. |

Other diluents such as glycols or liquid short chain alcohol alkoxylates or mixture of diluents can also be used to dilute AEP.

Example 3. Surfactants in Aqueous High Load Glyphosate Formulations

Compatibilities of various surfactants in high load glyphosate (K salt) formulations were obtained and are set forth in Table 3. Surfactants are useful as adjuvants for pesticides.

High load pesticide formulations have advantages of shipping less water and using less material for shipping containers. However, high load formulations can be difficult to incorporate the amount of adjuvants necessary for efficacy because the high load formulation frequently becomes separated at >55° C. storage temperature. Typically, the amount of the adjuvant in formulation preferably is at least 8 wt. % for acceptable efficacy.

TABLE 3

| Compatibilities of various AEPs in high load glyphosate formulations | | | | | |
|---|---|---|---|---|---|
| Smpl | K-glyphosate (48.2% ae), wt. % | Water, wt. % | Surfactant | Sample wt. % | Cloud point, ° C. |
| 3.1 | 82.2 | 7.8 | Tomamine PA14-2G | 10 | >80 |
| 3.2 | 82.2 | 7.8 | Tomamine PA14-4G | 10 | 75 |
| 3.3* | 86.8 | 3.2 | Armeen EA13i-2G | 10 | 60 |
| 3.4 | 82.2 | 7.8 | Armeen EA13i-4G | 10 | >80 |
| 3.5* | 86.8 | 3.2 | Armeen EA13i-10G | 10 | >80 |
| 3.6* | 86.8 | 3.2 | Armeen EA13i-12G | 10 | >80 |
| 3.7 | 82.2 | 7.8 | Tomamine DA14-3G | 10 | >80 |
| 3.8 | 82.2 | 7.8 | Tomamine DA14-6G | 10 | >80 |
| 3.9 | 82.2 | 7.8 | Jeffamine ® XTJ 435-2G (without catalyst) | 10 | >80 |
| 3.10 | 82.2 | 7.8 | Jeffamine ® XTJ 435-3G | 10 | >80 |
| 3.11 | 82.2 | 7.8 | Jeffamine ® XTJ 435-4G | 10 | >80 |
| 3.12 | 82.2 | 7.8 | Jeffamine ® XTJ 435-5G | 10 | >80 |
| 3.13 | 82.2 | 7.8 | Armeen EA13i-10G N-oxide | 10 | >80 |
| 3.14 | 82.2 | 7.8 | Armeen EA13i-12G N-oxide | 10 | >80 |
| 3.15 | 82.8 | 7.8 | Armeen EA13i-2G methyl chloride quat | 10 | <25 |
| 3.16 | 75.5 | 14.5 | Armeen EA13i-2G methyl chloride quat | 10 | >80 |
| 3.17 | 61.9 | 28.1 | Armeen EA13i-2G methyl chloride quat | 10 | >80 |
| 3.18 | 82.2 | 5.3 | Armeen EA13i-10G methyl chloride quat | 12.5 | >80 |
| 3.19 | 82.2 | 5.3 | Armeen EA13i-12G methyl chloride quat | 12.5 | >80 |

*for these sample K-glyphosate used is 45.62% ae.

All samples in Table 3 are clear at room temperature. The cloud point is the temperature at which the sample turns cloudy as the temperature is raised. The data in Table 3 shows that the AEP's of the present disclosure have excellent compatibility in high load glyphosate formulations.

TABLE 4

| Compatibilities of various surfactants in high load pesticide formulations | | | | | |
|---|---|---|---|---|---|
| Smpl | Name of Pesticide | Wt. % of Pesticide | Name of Surfactant | Wt. % of Surf | Comment |
| 4.1 | Base camp Amine 4 (46.8% 2,4-DDMA) | 90 | Armeen EA13i-4G | 10 | Heated to 70° C. to dissolve into clr solution, low viscosity |
| 4.2 | Ammonium glufosinate (50% ai) | 85 | Armeen EA13i-2G quat | 15 | 2° C.-80° C. clr |
| 4.3 | Base camp Amine 4 (46.8% 2,4-DDMA) | 85 | Armeen EA13i-2G quat | 15 | 2° C.-80° C. clr |
| 4.4 | Dicamba-IPA (40% ae) | 85 | Armeen EA13i-2G quat | 15 | 2° C.-80° C. clr |
| 4.5 | Base camp Amine 4 (46.8% 2,4-DDMA) | 87.5 | Armeen EA13i-10G Oxide | 12.5 | clr 0° C.-70° C. |
| 4.6 | Base camp Amine 4 (46.8% 2,4-DDMA) | 87.5 | Armeen EA13i-12G Oxide | 12.5 | clr 0° C.-70° C. |
| 4.7 | Dicamba-IPA (40% ae) | 87.5 | Armeen EA-13i-10G Oxide | 12.5 | clr 0° C.-70° C. |
| 4.8 | Dicamba-IPA (40% ae) | 87.5 | Armeen EA13i-12G Oxide | 12.5 | clr 0° C.-70° C. |
| 4.9 | Ammonium glufosinate (50% ai) | 87.5 | Armeen EA13i-10G Oxide | 12.5 | clr 0° C.-70° C. |

TABLE 4-continued

Compatibilities of various surfactants in high load pesticide formulations

| Smpl | Name of Pesticide | Wt. % of Pesticide | Name of Surfactant | Wt. % of Surf | Comment |
|---|---|---|---|---|---|
| 4.10 | Ammonium glufosinate (50% ai) | 87.5 | Armeen EA13i-12G Oxide | 12.5 | clr 0° C.-70° C. |
| 4.11 | Base camp amine 4 (40% ae) | 85 | Armeen EA13i-12G quat | 15 | −15° C.-80 C. clr. |
| 4.12 | Dicamba-IPA (40% ae) | 85 | Armeen EA13i-12G quat | 15 | 0° C.-80 C. clr. |
| 4.13 | Ammonium glufosinate (50% ai) | 85 | Armeen EA13i-12G quat | 15 | −15° C.-80 C. clr |
| 4.14 | Ammonium glufosinate (50% ai) | 70 | Armeen EA13i-12G quat | 30 | −15° C.-80 C. clr. |
| 4.15 | Base camp amine 4 (40% ae) | 90 | Jeffamine XTJ-435-6G | 10 | 0° C.-70 C. clr. |
| 4.16 | Dicamba-IPA (40% ae) | 90 | Jeffamine XTJ-435-6G | 10 | 0° C.-70 C. clr. |
| 4.17 | Ammonium glufosinate (50% ai) | 90 | Jeffamine XTJ-435-6G | 10 | RT-70 C. clr. |

The results show that the alkyl etheramine polyglycerols (AEPs) have excellent compatibility in high load pesticide formulations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. An agrochemical composition comprising:

an agrochemical chosen from herbicides, fungicides, insecticides and combinations thereof, wherein the herbicide is chosen from glyphosate, dicamba, glufosinate, 2,4-D, and combinations thereof; and at least one surfactant having the structure:

(I)

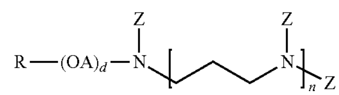

wherein each R is independently a $C_6$ to $C_{22}$ linear or branched, saturated or unsaturated hydrocarbon group;

wherein each Z is independently a glyceryl residue $(glyceryl)_a$ or H, so long as at least one Z is (glyceryl) a wherein a is of from 1 to 30;

wherein O is oxygen, A is independently a linear or branched $C_2$ to $C_4$ alkylene group, d is from 1 to 20; and wherein each n is independently of from 0 to 5;

(II)

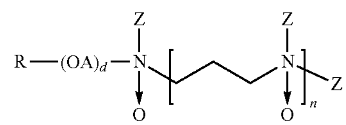

wherein each R is independently a $C_6$ to $C_{22}$ linear or branched, saturated or unsaturated hydrocarbon group;

wherein A is independently a linear or branched $C_2$ to $C_4$ alkylene group;

wherein d is from 1 to 20;

where each O is independently optionally present as long as at least one O is present;

wherein each Z is independently a glyceryl residue $(glyceryl)_a$ or H, as long as at least one Z is present wherein a is of from 1 to 30; and wherein each n is independently of from 0 to 5; or (III)

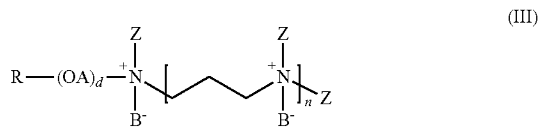

wherein each R is independently a $C_6$ to $C_{22}$ linear or branched, saturated or unsaturated hydrocarbon group;

wherein A is independently a linear or branched $C_2$ to $C_4$ alkylene group;

wherein d is from 1 to 20;

wherein each $B^-$ is independently optionally present and when present is $R^1X^-$, so long as at least one $B^-$ is present;

wherein each $R^1$ a methyl or ethyl group;

wherein each $X^-$ is independently $Cl^-$, $Br^-$, $CH_3OSO_3^-$, $CH_3CH_2OSO_3^-$;

wherein each Z is independently a glyceryl residue (glyceryl)$_a$ or H as long as at least one Z is present wherein a is of from 1 to 30; and wherein each n is independently of from 0 to 5.

2. The agrochemical composition of claim 1 wherein each A is an ethylene group.

3. The agrochemical composition of claim 1 wherein each A is a linear propylene group or a branched propylene group.

4. The agrochemical composition of claim 1 wherein each d is independently of from greater than 1 up to 20 and each OA is independently a combination of one or more $OCH_2CH_2$ groups and one or more $OCH_2CH_2CH_2$ groups in a random configuration.

5. The agrochemical composition of claim 1 wherein each d is independently of from greater than 1 up to 20 and each OA is independently a combination of one or more $OCH_2CH_2$ groups and one or more $OCH_2CH_2CH_2$ groups in a block configuration.

6. The agrochemical composition according to claim 1 wherein each d is independently of from 1 to 4.

7. The agrochemical composition according to claim 1 wherein each glyceryl residue independently comprises a linear portion, a branched portion, and a cyclic portion.

8. The agrochemical composition according to claim 1 wherein each R is independently a $C_8$-$C_{18}$ group.

9. The agrochemical composition according to claim 1 wherein each R is independently a $C_{12}$-$C_{18}$ group.

10. The agrochemical composition according to claim 1 wherein each R is independently a hydrocarbon group derived from an animal source, a vegetable source, a microbial/algae source, and combinations thereof.

11. The agrochemical composition according to claim 1 wherein said agrochemical is glyphosate or glufosinate.

12. The agrochemical composition according to claim 1 wherein said surfactant is the derivative of the reaction product or the reaction product of glycidol and at least one amine having the following structure:

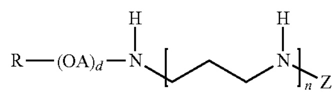

wherein R is a $C_6$ to $C_{22}$ linear or branched, saturated or unsaturated hydrocarbon group;

wherein A is a $C_2$ to $C_4$ linear or branched alkylene group;

wherein d is a number from 1 to 20; and wherein n is a number from 0 to 5.

13. An agrochemical composition comprising:

glyphosate or glufosinate present in an amount of from 5 to 90 wt % based on a total weight of the agrochemical composition; and at least one surfactant present in an amount of from 0.001 to 30 wt % based on a total weight of the agrochemical composition, wherein the at least one surfactant has the structure:

(I)

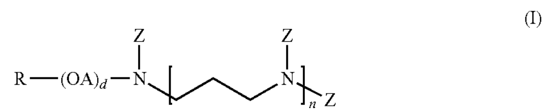

wherein each R is independently a $C_6$ to $C_{22}$ linear or branched, saturated or unsaturated hydrocarbon group;

wherein each Z is independently a glyceryl residue (glyceryl)$_a$ or H, so long as at least one Z is (glyceryl) a wherein a is of from 1 to 30;

wherein O is oxygen, A is independently a linear or branched $C_2$ to $C_4$ alkylene group, d is from 1 to 20; and wherein each n is independently of from 2 to 5;

(II)

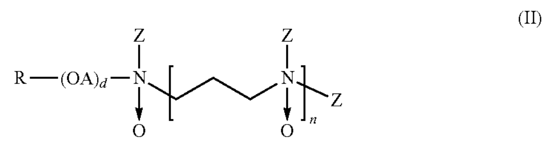

wherein each R is independently a $C_6$ to $C_{22}$ linear or branched, saturated or unsaturated hydrocarbon group;

wherein A is independently a linear or branched $C_2$ to $C_4$ alkylene group;

wherein d is from 1 to 20;

where each O is independently optionally present as long as at least one O is present;

wherein each Z is independently a glyceryl residue (glyceryl)$_a$ or H, as long as at least one Z is present wherein a is of from 1 to 30; and wherein each n is independently of from 2 to 5; or (III)

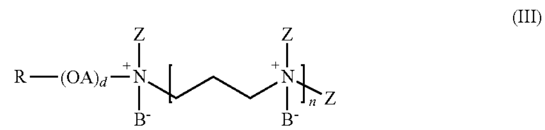

wherein each R is independently a $C_6$ to $C_{22}$ linear or branched, saturated or unsaturated hydrocarbon group;

wherein A is independently a linear or branched $C_2$ to $C_4$ alkylene group;

wherein d is from 1 to 20;

wherein each $B^-$ is independently optionally present and when present is $R^1X^-$, so long as at least one $B^-$ is present;

wherein each $R^1$ a methyl or ethyl group;

wherein each $X^-$ is independently $Cl^-$, $Br^-$, $CH_3OSO_3$, $CH_3CH_2OSO_3^-$;

wherein each Z is independently a glyceryl residue (glyceryl)$_a$ or H as long as at least one Z is present wherein a is of from 1 to 30; and wherein each n is independently of from 2 to 5.

14. An agrochemical composition comprising:

an agrochemical; and at least one surfactant having the structure:

(I)

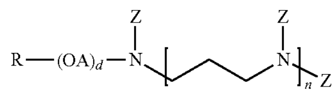

wherein each R is independently a $C_6$ to $C_{22}$ linear or branched, saturated or unsaturated hydrocarbon group;

wherein each Z is independently a glyceryl residue (glyceryl)$_a$ or H, so long as at least one Z is (glyceryl) a wherein a is of from 1 to 30;

wherein O is oxygen, A is independently a linear or branched $C_2$ to $C_4$ alkylene group, d is from 1 to 20; and wherein each n is independently of from 2 to 5;

(II)

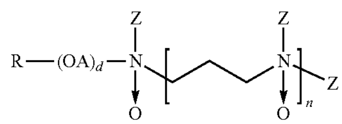

wherein each R is independently a $C_6$ to $C_{22}$ linear or branched, saturated or unsaturated hydrocarbon group;

wherein A is independently a linear or branched $C_2$ to $C_4$ alkylene group;

wherein d is from 1 to 20;

where each O is independently optionally present as long as at least one O is present;

wherein each Z is independently a glyceryl residue (glyceryl)$_a$ or H, as long as at least one Z is present wherein a is of from 1 to 30; and wherein each n is independently of from 2 to 5; or (III)

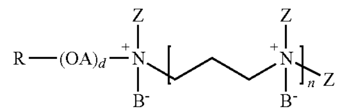

wherein each R is independently a $C_6$ to $C_{22}$ linear or branched, saturated or unsaturated hydrocarbon group;

wherein A is independently a linear or branched $C_2$ to $C_4$ alkylene group;

wherein d is from 1 to 20;

wherein each $B^-$ is independently optionally present and when present is $R^1X^-$, so long as at least one $B^-$ is present;

wherein each $R^1$ a methyl or ethyl group;

wherein each $X^-$ is independently $Cl^-$, $Br^-$, $CH_3OSO_3$, $CH_3CH_2OSO_3^-$;

wherein each Z is independently a glyceryl residue (glyceryl)$_a$ or H as long as at least one Z is present wherein a is of from 1 to 30; and wherein each n is independently of from 2 to 5.

15. A method of forming the agrochemical composition according to claim 1, said method comprising the step of combining the at least one surfactant and the agrochemical.

16. A method of treating vegetation comprising the step of applying the agrochemical composition according to claim 1 to the vegetation.

* * * * *